US007526895B2

(12) United States Patent
Edgar et al.

(10) Patent No.: US 7,526,895 B2
(45) Date of Patent: May 5, 2009

(54) RUBBER BOOT-BASED ROOF FLASHING APPARATUS

(75) Inventors: Glen A. Edgar, Lancaster, OH (US);
Rodney L. Carr, Logan, OH (US);
Scott A. Newhouse, Grove City, OH (US)

(73) Assignee: Selkirk Corporation, Richardson, TX (US)

( * ) Notice: Subject to any disclaimer, the term of this patent is extended or adjusted under 35 U.S.C. 154(b) by 655 days.

(21) Appl. No.: 11/018,459

(22) Filed: Dec. 21, 2004

(65) Prior Publication Data

US 2006/0130411 A1    Jun. 22, 2006

(51) Int. Cl.
*E04B 7/00* (2006.01)

(52) U.S. Cl. .............................. 52/198; 52/199; 52/218; 52/219; 454/365

(58) Field of Classification Search .................... 52/198, 52/199, 218, 219; 454/365; 138/112–114, 138/96 R, 285
See application file for complete search history.

(56) References Cited

U.S. PATENT DOCUMENTS

| | | | | |
|---|---|---|---|---|
| 2,916,983 A | * | 12/1959 | Kinkead | 454/8 |
| 3,105,664 A | * | 10/1963 | Poradun | 248/56 |
| 3,872,780 A | * | 3/1975 | Zanias | 454/47 |
| 4,008,655 A | * | 2/1977 | Rahman | 454/44 |
| 4,036,617 A | * | 7/1977 | Leonard et al. | 62/50.7 |
| 4,442,643 A | * | 4/1984 | Stadheim | 52/219 |
| 4,512,119 A | * | 4/1985 | Willoughby | 52/58 |
| 4,664,390 A | | 5/1987 | Houseman | |
| 5,036,636 A | | 8/1991 | Hasty | |
| 5,347,776 A | * | 9/1994 | Skoff | 52/219 |
| 5,501,472 A | | 3/1996 | Brancher et al. | |
| 5,536,048 A | | 7/1996 | Orr | |
| 5,970,667 A | | 10/1999 | Thaler | |
| 6,185,885 B1 | * | 2/2001 | Thaler | 52/219 |
| 6,244,006 B1 | | 6/2001 | Shue et al. | |

FOREIGN PATENT DOCUMENTS

EP    O 896 111    2/1999

* cited by examiner

*Primary Examiner*—Richard E Chilcot, Jr.
*Assistant Examiner*—Jessica Laux
(74) *Attorney, Agent, or Firm*—J. A. Thurnau, Esq.; J. L. Mahurin, Esq.; P. N. Dunlap, Esq.

(57) ABSTRACT

To flash a hot gas vent pipe, representatively a chimney pipe, extending upwardly through a roof opening, a tubular sleeve having vertically extending spacer members interiorly secured thereto, with upper ends projecting above the upper sleeve end, is concentrically placed around the chimney pipe and anchored to the roof. A rubber boot is then placed around the sleeve and secured to the roof. Finally, a storm collar is downwardly telescoped onto the chimney pipe and rests on the upper end of the sleeve spacer members. Vertical cooling passages are defined between adjacent spacer member pairs, and through their interiors, and have upper exit portions communicating with the storm collar interior.

21 Claims, 4 Drawing Sheets

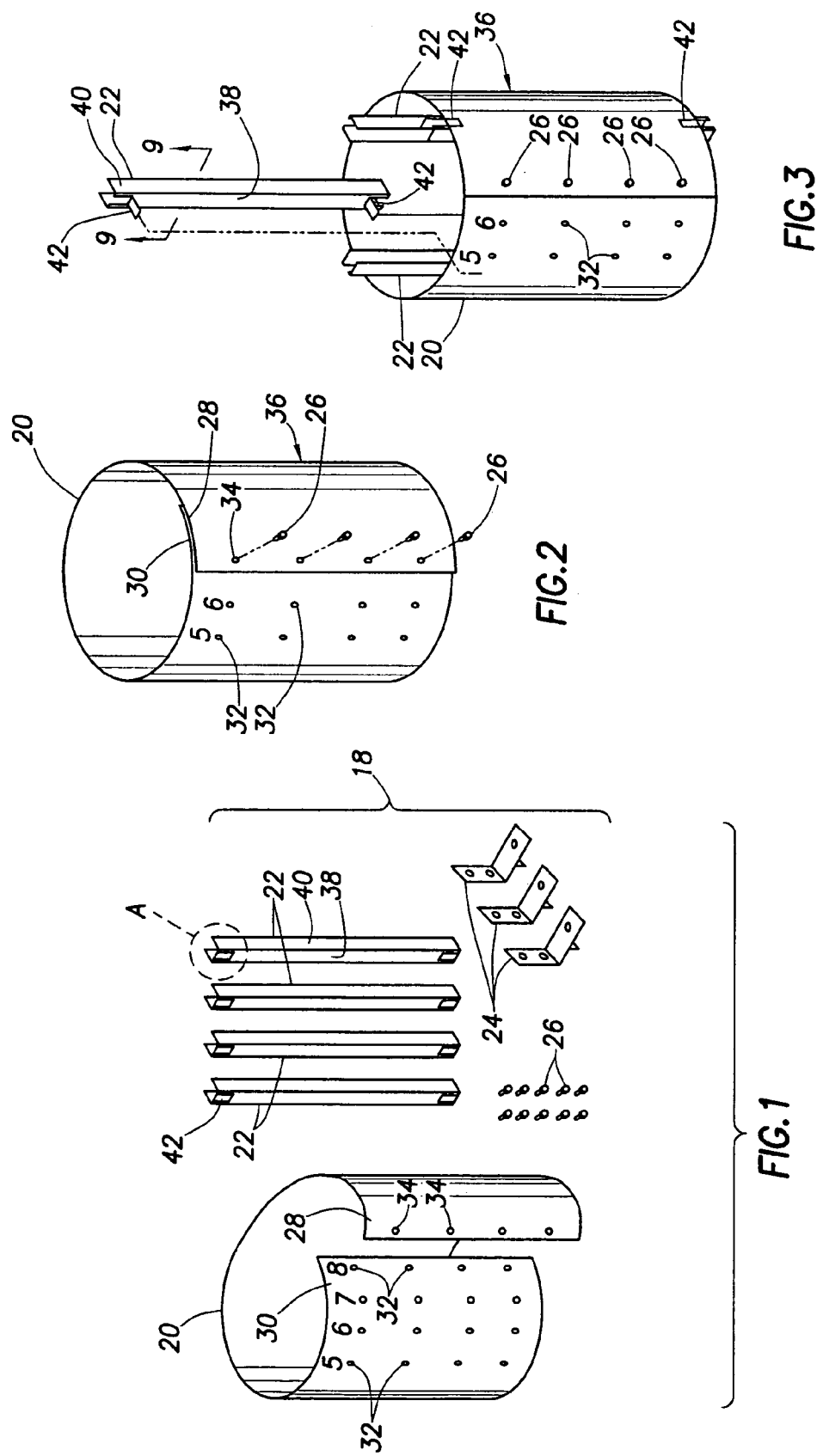

RUBBER BOOT-BASED ROOF FLASHING APPARATUS

BACKGROUND OF THE INVENTION

The present invention generally relates to the flashing of chimneys and other hot gas vent conduit structures extending through roofs and, in a representatively illustrated embodiment thereof, more particularly provides novel roof flashing apparatus which permits a rubber boot to be utilized in the flashing of a metal chimney pipe extending through a roof opening without subjecting the rubber boot to an undesirably high temperature during firing of the fuel-fired heating apparatus with which the chimney pipe is operatively associated.

Rubber flashing boots are commonly used as flashing structures for sealing around non-heated pipes, such as plumbing fixture vent pipes, extending through roof openings. For a variety of reasons it would be desirable to utilize a rubber boot to flash around a heated pipe, such as a metal chimney pipe, extending through a roof opening. However, in the past this use of a rubber flashing boot has not been feasible since the necessary UL safety certification for this flashing application has not been obtainable due to the impermissibly high boot temperature levels resulting during the flow of hot combustion products through the chimney pipe. Additionally, chimney pipes flashed using rubber boots tend to fail to meet applicable wind loading test standards.

As can be seen, a need exists for apparatus and methods permitting the use of rubber flashing boots in through-roof chimney pipe applications. It is to this need that the present invention is directed.

SUMMARY OF THE INVENTION

In carrying out principles of the present invention, in accordance with a representatively illustrated embodiment thereof, a specially designed flashing adapter kit is provided for use in conjunction with a rubber flashing boot to flash a hot gas vent conduit, representatively a chimney pipe, at a roof opening through which it extends. Use of the flashing kit enables the overall rubber boot-based chimney flashing structure to be UL certified due to the adapter kit's prevention of the boot from reaching unacceptably high operating temperatures, and also braces the chimney pipe to an extent permitting it to meet applicable wind load test standards.

The flashing adapter kit, in a representatively illustrated embodiment thereof, includes a sleeve structure useable to define a sleeve member outwardly circumscribing the chimney pipe and having an open upper end, and being operatively receivable in a rubber flashing boot. The kit also includes elongated spacer members preferably having integral securement portions useable to secure the spacer members on an interior surface portion of the sleeve member in a circumferentially spaced array in which the spacer members longitudinally extend vertically along the outer surface of the chimney pipe, in a manner holding the sleeve member in a concentric relationship with the chimney pipe and defining vertically extending cooling passages between circumferentially adjacent pairs of spacer members, with upper ends of the spacer members projecting upwardly beyond the upper end of the sleeve member. Representatively, the spacer members are support channels having generally U-shaped cross-sections along their lengths, but could alternatively have a variety of other configurations if desired. The kit further includes connection members interconnectable between the sleeve member and the roof to hold the sleeve member in a predetermined orientation relative to the roof opening periphery and brace the sleeve member, and thus the chimney pipe, against wind loads.

Preferably, the sleeve structure includes a panel member bendable to a tubular configuration and having a first end portion with a column of connection holes therein, and a second end portion with a plurality of parallel columns of connection holes therein, the first end portion being overlappable with the second end portion to align the connection holes of said first end portion with the holes in a selectively variable one of said connection hole columns in said second end portion to thereby selectively vary the diameter of the sleeve structure, and fastening members insertable into aligned hole pairs in said first and second end portions to hold the bent panel member in a tubular sleeve configuration of a predetermined diameter. In an illustrated embodiment of the panel member each connection hole column in the second end portion of the panel member has numeric indicia associated therewith and indicative of a desired diameter of the sleeve structure.

In accordance with an aspect of the invention, the securement portions of the spacer members are integral bendable tab portions of the spacer members disposed at their opposite ends. The spacer members are installed within the sleeve by bending their opposite end tabs outwardly over and along the opposite ends of the sleeve. Alternatively, if desired, separate securement structures, such as rivets or screws, could be used to operatively connect the spacer members to the sleeve structure.

Representatively using the flashing adapter kit, a flashed chimney structure may be formed which includes a chimney pipe having an upper end portion vertically extending through a central portion of a roof opening, an open-ended sleeve member representatively formed from the bendable panel portion of the kit and coaxially circumscribing the upper end portion of the chimney pipe in a horizontally outwardly spaced relationship therewith. The vertically elongated spacer members from the kit are connected within the sleeve in a circumferentially spaced relationship around the chimney pipe and laterally extend between the sleeve and the chimney pipe in a manner such that vertical cooling passages are defined between circumferentially adjacent pairs of the spacer members. Vertical cooling passages also extend through the interiors of the preferably channel-shaped spacer members.

Circumferentially spaced connection members, representatively from the kit, extend laterally outwardly from the sleeve and interconnect the sleeve with portions of the roof bordering said opening therein. A resilient flashing boot closely and sealingly receives the sleeve and is operatively secured to the roof. A storm collar through which the chimney pipe upwardly extends has an upper end supported in an upwardly spaced relationship with the upper end of said sleeve, preferably resting on the upwardly projecting upper end portions of the spacer members, with the interior of said storm collar defining a downwardly opening outlet for upper end portions of said vertical cooling passages.

Thus, the portion of the rubber boot through which the chimney pipe upwardly extends is spaced apart by the sleeve from the rubber boot and is air insulated from the hot chimney pipe. Hot air which might potentially build up in the cooling passages between circumferentially adjacent pairs of the vertical spacer members is simply permitted to vent outwardly from the open upper ends of such cooling passages, as well as vertically through the interiors of the channel-shaped spacer members, and be downwardly discharged through the interior of the storm collar. The bracing of the sleeve to the roof, by the aforementioned connection members, also braces the chimney pipe portion extending through the sleeve to an extent permitting the overall flashed chimney apparatus to meet applicable wind load test standards.

While a chimney pipe roof flashing structure is representatively illustrated and described herein, the invention is not limited to the use and flashing of chimney pipes. Principles of the invention may also be utilized to advantage to flash other types of conduit structures through which hot gas may be vented through a roof opening to atmosphere. Examples of such other types of conduit structures include, but are not limited to, gas vents, L-vents and grease ducts. Additionally, principles of the invention may also be advantageously utilized with flashing boots of resilient materials other than rubber.

BRIEF DESCRIPTION OF THE DRAWINGS

FIG. 1 is a perspective view of a flashing adapter kit embodying principles of the present invention;

FIG. 2 is a perspective view of a flashing sleeve member formed from a portion of the kit;

FIG. 3 perspectively illustrates the connection of spacer member portions of the kit within the interior of the sleeve member;

DETAILED DESCRIPTION

Figure 7:
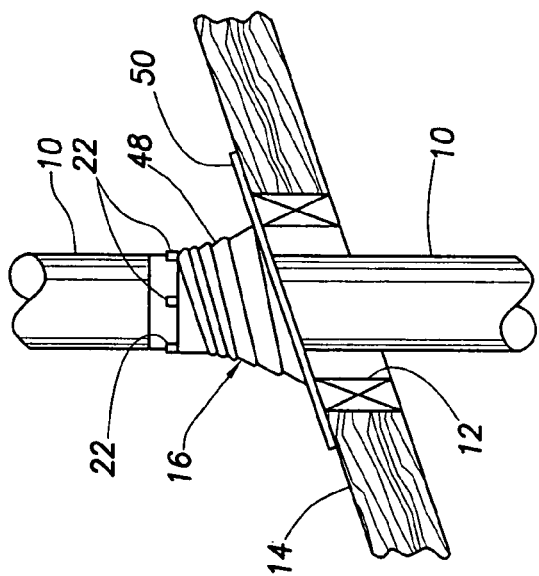
FIG. 7 cross-sectionally illustrates a rubber flashing boot installed on the sleeve and connected to the roof at the opening therein.

AS illustrated in the accompanying drawing FIGS. 1-11, the present invention provides apparatus and methods for flashing a metal chimney pipe 10 (see FIGS. 6 and 7), which extends through an opening 12 in a roof 14, utilizing a conventional rubber flashing boot 16 (see FIGS. 7 and 8) which may alternatively be a flashing boot of another resilient material such as a suitable plastic-based material. Due to the subsequently discussed unique configuration of the flashing apparatus, the overall through-roof chimney installation is able to incorporate the rubber boot 16 and still be UL certified—meeting both the thermal and structural (wind load) requirements in the UL standards.

The flashing apparatus of the present invention is representatively incorporated in a convenient flashing adapter kit 18 (see FIG. 1) which includes a rectangular sheet metal sleeve panel 20, four elongated metal spacer channels 22, three generally L-shaped sheet metal connection brackets 24, and ten sheet metal screws 26.

Sleeve panel 20 (see FIG. 1) has opposite horizontal end portions 28 and 30. Four horizontally spaced columns of vertically spaced connection holes 32 (representatively having four holes 32 in each column) are formed in the panel end portion 30, and a single column of vertically spaced connection holes 34 is formed in the panel end portion 28 and is alignable with any selected column of the holes 32 in panel end portion 30. AS shown in FIG. 2, the panel 20 may be bent to an open-ended tubular configuration to form a variable diameter flashing sleeve 36.

Panel 20 is retained in this configuration by outwardly overlapping its end portion 28 with its end portion 30 and aligning the connection holes 34 with the connection holes 32 one of the four columns thereof on the panel end portion 30, and then threading four of the sheet metal screws 26 through the aligned hole pairs 34,32. As shown in FIG. 1, above the top ends of these four columns of connection holes 32 are the numbers "5", "6", "7" and "8". These numbers represent the inner diameter of the chimney pipe 10 on which the flashing sleeve 36 is to be concentrically mounted (as later described herein), with the flashing sleeve 36 having a diameter 2 inches greater than the outer diameter of the chimney pipe 10. For example, by aligning the holes 34 with the holes 32 in the "7" column (as representatively shown in FIG. 2), the sleeve 36 is useable with a 7 inch diameter chimney pipe, with the sleeve 36 having a two inch greater diameter (e.g., a 9 inch diameter). As will be readily appreciated by those of skill in this particular art, the illustrated diameter range of the sleeve 36 is merely representative. Greater or lesser diameter ranges could alternatively be utilized without departing from principles of the present invention. Alternatively, the sleeve 36 could be provided as a fixed diameter structure instead of having the illustrated adjustable diameter.

Each of the four elongated spacer channel members 22 in the kit 18 has, along its length, a generally U-shaped cross-section (see FIG. 9) defined by an inner side base wall 38 from each vertical edge of which a transverse leg portion 40 horizontally outwardly extends. At the top and bottom ends of each base wall 38 is an outwardly bendable connection tab 42.

Figure 4:
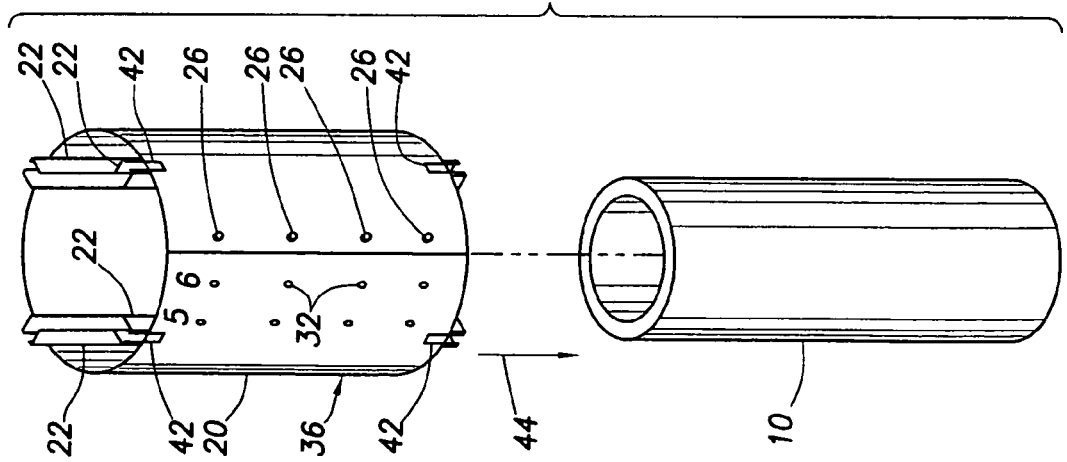
FIG. 4 perspectively illustrates the placement of the FIG. 3 sleeve/spacer subassembly over a chimney pipe.

The flashing of the chimney pipe 10 using the flashing adapter kit 18 will now be described. Referring initially to FIG. 3, after the sleeve 36 has been constructed and properly sized as previously described in conjunction with FIG. 2, the four vertically elongated spacer channel members 22 are installed in a circumferentially spaced array around the interior side surface periphery of the sleeve 36, with the base walls 38 of the spacer channel members 22 facing the inner side surface of the sleeve 36. Each spacer channel member 22 is longer than the length of the sleeve 36 and is secured in place within the sleeve 36 by bending the top and bottom end tabs 42 outwardly over the top and bottom edges of the sleeve 36 and then outwardly along its outer side surface as indicated in FIGS. 3 and 4. With the spacer channel members 22 installed on the sleeve 36 in this manner (as shown in FIG. 4), upper and lower end portions of the spacer channel members 22 respectively project upwardly and downwardly beyond the top and bottom ends of the sleeve 36. As illustrated, the top and bottom ends of each spacer channel members 22 are identically configured so that they are conveniently reversible and cannot be installed in an upside down orientation within the sleeve 36.

Figure 5:
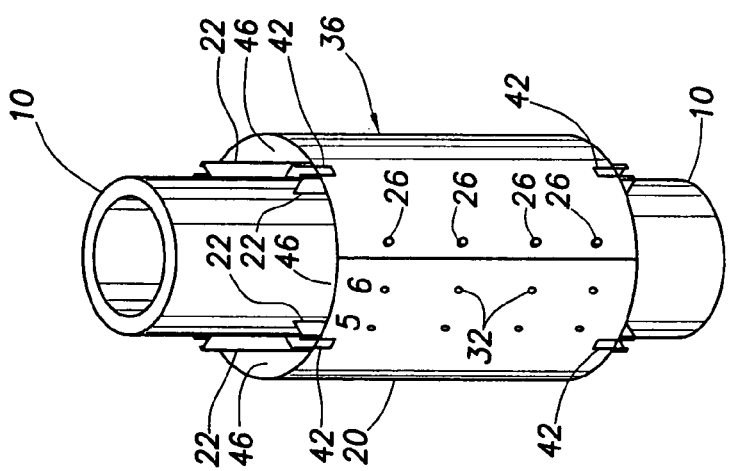
FIG. 5 perspectively illustrates the sleeve/spacer member subassembly operatively positioned on the chimney pipe.
Figure 6:
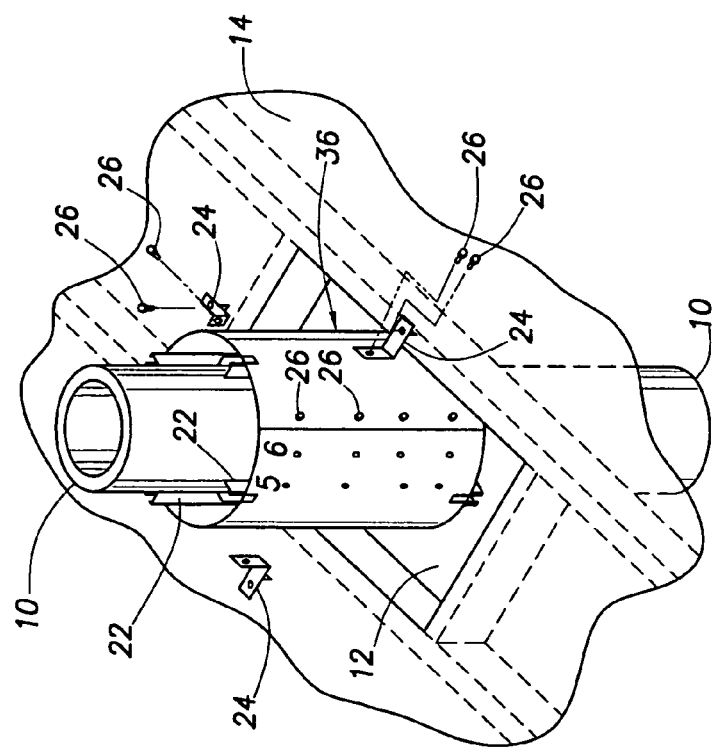
FIG. 6 perspectively illustrates the connection of the sleeve within a roof through which the chimney pipe upwardly extends.
Figure 9:
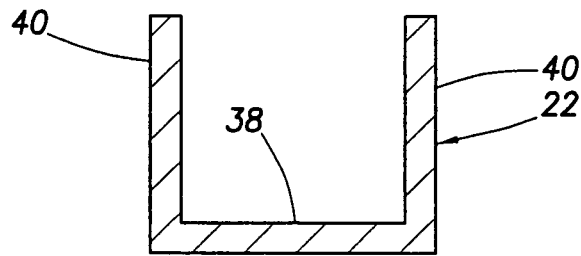
FIG. 9 is an enlarged cross-sectional view through a spacer member taken along line 9-9 of FIG. 3.
Figure 10:
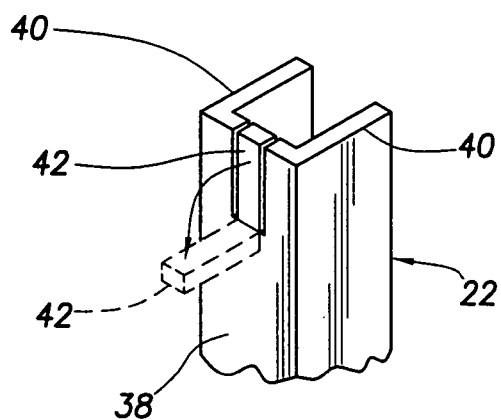
FIG. 10 is an enlarged detail view of the dashed circle area "A" of FIG. 1.

Next, as indicated by the arrow 44 in FIG. 4, the sleeve/spacer subassembly 36,22 is telescoped downwardly onto the upper end of the chimney pipe 10 to position the sleeve 36 on the chimney pipe 10 as illustrated in FIGS. 5 and 6. The spacer channel members 22 engage the outer side surface of the chimney pipe 10, centering it within the sleeve 36. A vertical cooling passage 46 is defined between each circumferentially adjacent pair of the vertically elongated spacer channel members 22, with the four cooling passages 46 each opening outwardly through the top and bottom ends of the sleeve 36. As shown in FIG. 6, the three brackets 24 are used to anchor the sleeve 36 centrally within the roof opening 12. Sheet metal screws 26 are used to secure vertical leg portions of the brackets 24 to the sleeve 36, and suitable nails (not shown) are used to secure the horizontal leg portions of the brackets 24 to the roof 14. This securely braces the installed sleeve 36, and thus the upper chimney pipe end portion extending through the sleeve 36, against wind loads.

With the brackets 24 installed in this manner, the neck portion 48 of the rubber boot 16 (see FIG. 7) is downwardly and sealingly telescoped over the sleeve 36 in a manner such that the upper end of the sleeve 36 is just slightly above or (as shown in FIG. 7) flush with the upper end of the boot neck 48. The flat base portion 50 of the installed rubber boot 16 is then suitably secured to the roof 14 over the opening 12 therein. As indicated in FIG. 7, upper end portions of the spacer channel members 22 project upwardly beyond the top end of the boot neck portion 48.

Figure 8:
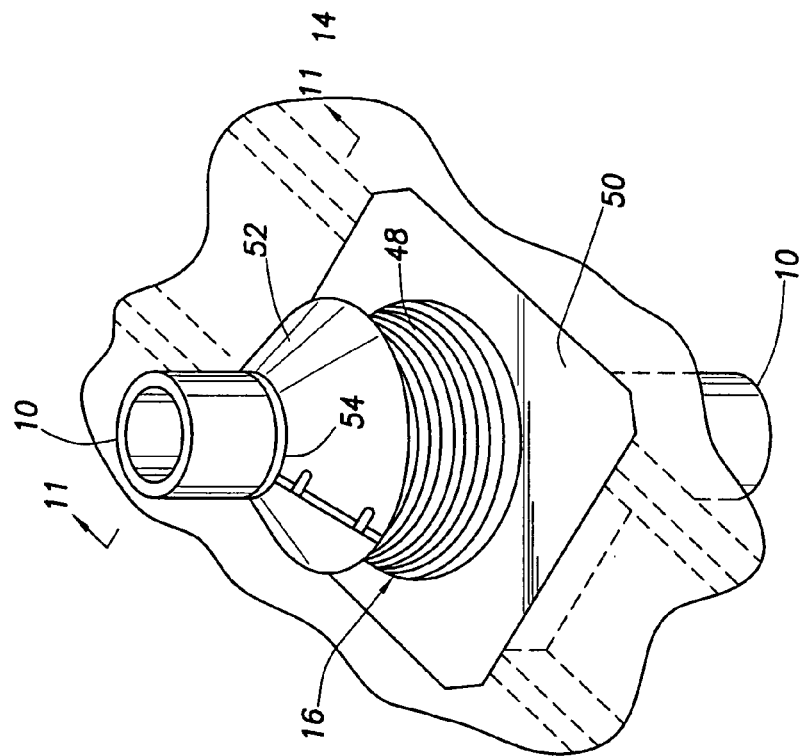
FIG. 8 perspectively illustrates a storm collar installed on the chimney pipe above the rubber boot.
Figure 11:
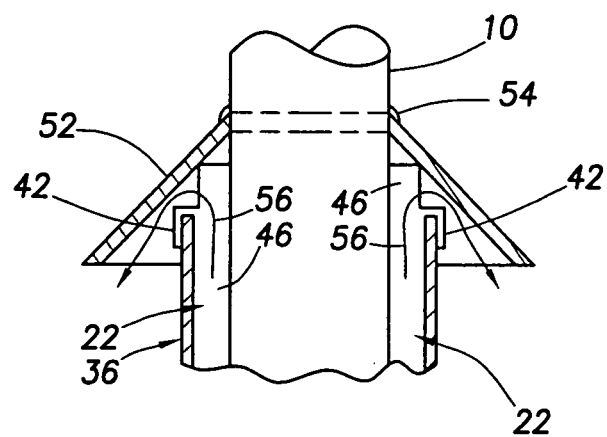
FIG. 11 is a schematic cross-sectional view through an upper portion of the assembled flashing assembly, taken along line 11-11 of FIG. 8, with the rubber boot removed for purposes of illustrative clarity.

As shown in FIGS. 8 and 11, a conventional annular, generally frustroconically shaped metal storm collar 52 is then installed around the chimney pipe 10 in a manner such that an upper end portion of the collar 52 comes to rest on the upper ends of the spacer channel members 22 (see FIG. 11). Finally, an annular bead 54 of sealant material is run around the juncture between the upper side portion of the collar 52 and the chimney pipe 10.

With the flashing adapter apparatus of the present invention installed in this manner, the rubber boot 16 is insulated from chimney pipe heat, created by the firing of the fuel-fired heating appliance (not shown) with which the chimney pipe 10 is operatively associated, to an extent that the illustrated rubber boot-based roof flashing system is UL certified. As can be seen in FIG. 11, the placement of the storm hood 52 atop the upwardly projecting ends of the spacer channel members 22 positions the interior of the hood 52 to define an outlet for the upper ends of the vertical passages 46 which the indicated cooling flow 56 may upwardly pass. Additional vertical cooling passages are also defined within the interiors of the spacer channel members 22.

While the present invention is particularly well suited to flashing a chimney pipe, it is not limited to use with a chimney pipe 10, but could alternatively be used to advantage with a variety of other types of vent conduit structures used to vent hot gas through a roof opening to atmosphere without departing from principles of the present invention. Also, the illustratively channel-shaped spacer members 22 may alternatively be provided with other configurations and cross-sections, and may have types of securement structures, either integral or separate, other than the representatively illustrated integral bendable tab portions 42 without departing from principles of the present invention. Moreover, while both the chimney pipe 10 and the sleeve panel 20 have been representatively illustrated as each being formed from a single layer of sheet metal, each of these components could alternatively be formed from suitable different materials, and/or be of thicker constructions, if desired without departing from principles of the present invention.

The foregoing detailed description is to be clearly understood as being given by way of illustration and example only, the spirit and scope of the present invention being limited solely by the appended claims.

What is claimed is:

1. A flashed vent conduit structure extending through a roof opening and comprising:
   a vent conduit through which hot gas may be vented to atmosphere, said vent conduit having an upper end portion vertically extending through the roof opening;
   an open-ended sleeve member coaxially circumscribing said upper end portion of said vent conduit in a horizontally outwardly spaced relationship therewith, said sleeve member having an upper end;
   circumferentially spaced, vertically elongated spacer members disposed between said vent conduit and said sleeve member and laterally extending therebetween in a manner such that vertical cooling passages are defined between circumferentially adjacent pairs of said spacer members, and vertical cooling passages are also defined within said spacer members;
   circumferentially spaced connection members extending laterally outwardly from said sleeve member and interconnecting said sleeve member and portions of the roof bordering the opening therein;
   a resilient flashing boot closely receiving said sleeve member and operatively secured to the roof; and
   a storm collar through which said vent conduit upwardly extends, said storm collar having an upper end supported in an upwardly spaced relationship with the upper end of said sleeve, the interior of said storm collar defining a downwardly opening outlet for upper end portions of said vertical cooling passages.

2. The flashed vent conduit structure of claim 1 wherein:
said vent conduit is a chimney pipe.

3. The flashed vent conduit structure of claim 1 wherein:
said spacer members have generally U-shaped cross-sections along their lengths.

4. The flashed vent conduit structure of claim 1 wherein:
said sleeve member has a tubular configuration and is configured to permit adjustment of its diameter.

5. The flashed vent conduit structure of claim 4 wherein:
said sleeve member is formed from a bendable panel member with overlapping first and second end portions, said first end portion having a column of connection holes therein which are aligned with the connection holes in one of a spaced plurality of hole columns in said second end portion, with fastening members extending through aligned hole pairs in said first and second end portions.

6. The flashed vent conduit structure of claim 5 wherein:
said sleeve member is of a sheet metal construction.

7. The flashed vent conduit structure of claim 1 wherein:
said spacer members have bendable portions connecting them to said sleeve member.

8. The flashed vent conduit structure of claim 7 wherein:
said bendable portions are tabs disposed at top and bottom ends of said spacer members and bent outwardly around and extending outwardly along an upper end portion of said sleeve member.

9. The flashed vent conduit structure of claim 1 wherein
upper end portions of said spacer members project upwardly beyond the upper end of said sleeve member, and
said upper end of said storm collar rests atop said upper end portions of said spacer members.

10. The flashed vent conduit structure of claim 1 wherein:
said resilient flashing boot is a rubber flashing boot.

11. The flashed vent conduit structure of claim 1. wherein:
said resilient flashing boot has a neck portion sealingly receiving said sleeve member, and a base portion secured to the roof.

12. The flashed vent conduit structure of claim 11 wherein:
upper end portions of said spacer members project upwardly beyond the upper end of said sleeve member, and the upper end of said neck portion of said resilient flashing boot is disposed below said upper end portions of said spacer members.

13. A flashing adapter kit useable in conjunction with a rubber flashing boot to flash a vent conduit extending through an opening in a roof and adapted to vent hot gas to atmosphere, said flashing adapter kit comprising:

a sleeve structure useable to define a sleeve member outwardly circumscribing the vent conduit and having an upper end, and being operatively receivable in a rubber flashing boot;

elongated spacer members having associated securement structures useable to secure said spacer members on an interior surface portion of the sleeve member in a circumferentially spaced array in which said spacer members longitudinally extend vertically along the outer surface of the vent conduit, in a manner holding the sleeve member in a concentric relationship with the vent conduit and defining vertically extending cooling passages between circumferentially adjacent pairs of said. spacer members, with upper ends of said cooling passages opening outwardly through said upper end of said sleeve structure;

each of said spacer members has a hollow configuration and defines in its interior a vertically extending cooling passage when operatively installed within said sleeve member; and connection members interconnectable between the sleeve member and the roof to hold the sleeve member in a predetermined orientation relative to the roof opening periphery and brace the sleeve member, and thus the chimney pipe, against wind loads.

14. The flashing adapter kit of claim 13 wherein:
said sleeve structure includes a panel member bendable to a tubular configuration and having a first end portion with a column of connection holes therein, and a second end portion with a plurality of parallel columns of connection holes therein, said first end portion being overlappable with said second end portion to align the connection holes of said first end portion with the holes in a selectively variable one of said connection hole columns in said second end portion to thereby selectively vary the diameter of said sleeve structure, and fastening members insertable into aligned hole pairs in said first and second end portions to hold the bent panel member in a tubular configuration of a predetermined diameter.

15. The flashing adapter kit of claim 14 wherein:
each connection hole column in said second end portion of said bendable panel member has numeric indicia associated therewith and indicative of a desired diameter of said sleeve structure.

16. The flashing adapter kit of claim 13 wherein:
said securement structures are integral portions of said spacer members.

17. The flashing adapter kit of claim 16 wherein:
said securement portions are bendable tab portions.

18. The flashing adapter kit of claim 17 wherein:
said bendable tab portions are disposed at ends of said spacer members.

19. The flashing adapter kit of claim 18 wherein:
said bendable tab portions are disposed at each end of each of said spacer members.

20. The flashing adapter kit of claim 13 wherein:
each of said spacer members has, along its length, a generally U-shaped configuration defined by a base wall having opposite side edges from which parallel side walls transversely project.

21. The flashing adapter kit of claim 13 wherein:
said securement structures are useable to position upper portions of said spacer members above said upper end of said sleeve structure.

* * * * *